(12) United States Patent
Jiang

(10) Patent No.: US 12,728,677 B2
(45) Date of Patent: Sep. 8, 2026

(54) AIR VALVE OF TIRE BEAD SEATER

(71) Applicant: Guangzhou Xiangwei Automotive Equipment Co., LTD, Guangzhou (CN)

(72) Inventor: Junsheng Jiang, Leiyang (CN)

(73) Assignee: Guangzhou Xiangwei Automotive Equipment Co., LTD, Guangzhou (CN)

( * ) Notice: Subject to any disclaimer, the term of this patent is extended or adjusted under 35 U.S.C. 154(b) by 440 days.

(21) Appl. No.: 18/470,930

(22) Filed: Sep. 20, 2023

(65) Prior Publication Data

US 2024/0217282 A1 Jul. 4, 2024

(30) Foreign Application Priority Data

Dec. 30, 2022 (CN) ........................ 202211720910.8

(51) Int. Cl.
*B60C 25/12* (2006.01)
*F16K 31/122* (2006.01)

(52) U.S. Cl.
CPC .......... *B60C 25/12* (2013.01); *F16K 31/1221* (2013.01)

(58) Field of Classification Search
CPC ......... B60C 25/12; B60C 25/145; B60S 5/04; F16K 15/20; F16K 25/04; F16K 31/1221; B29C 73/166
USPC .......................................................... 157/1.1
See application file for complete search history.

(56) References Cited

U.S. PATENT DOCUMENTS 9,080,832 B2 * 7/2015 Brahler, II .......... F41H 13/0006
9,649,897 B2 * 5/2017 Kunau .................. B60C 25/145

* cited by examiner

*Primary Examiner* — Hadi Shakeri
(74) *Attorney, Agent, or Firm* — SALIWANCHIK, LLOYD & EISENSCHENK

(57) ABSTRACT

The present disclosure discloses an air valve for a tire bead seater solves a problem that an inner piston in the air valve is prone to be difficult in moving upwards or downwards due to a thermal expansion and contraction of the piston and has a poor sealing performance when using a tire bead seater, and it is difficult to replace a barrel of the air valve with barrels in other different shapes to satisfy different inflation requirements. The air valve of a tire bead seater includes an inflation cylinder, where a top end of the inflation cylinder is provided with a cylinder mouth. In the present disclosure, through a cooperation between an upper sealing ring and a lower sealing ring that are made from PEEK material, it has a good temperature adaptability and a small deformation.

10 Claims, 6 Drawing Sheets

AIR VALVE OF TIRE BEAD SEATER

CROSS REFERENCE TO RELATED APPLICATIONS

The present application claims the priority of Chinese patent application No. 202211720910.8, filed on Dec. 30, 2022, which is hereby incorporated by reference in its entirety.

TECHNICAL FIELD

The present disclosure relates to the technical field of tire inflation guns, and in particular, to an air valve for a tire bead seater.

BACKGROUND

Tires are circular elastic rubber products assembled on vehicles or machines that roll along the ground. In an actual assembly process, due to high hardness of the outer tires, the shape of the outer tires is usually a flattened shape when installing the outer tires on the wheel hub, and in order to restore the outer tires to a complete budging shape, it is necessary to inflate a cavity between the outer tire and the wheel hub, and a tire inflation gun is needed for inflation.

Tire inflation gun is a gun-shaped object used for inflating a tire, which can quickly inject air from a muzzle to fill an interior of tire. An air valve structure in the inner of different tire inflation guns are different.

When an existing air valve of a tire bead seater is used, an inner piston in the air valve is prone to be difficult in moving upwards or downwards due to a thermal expansion and contraction and the sealing performance is poor, and it is difficult to replace a barrel of the air valve with barrels in other different shapes to satisfy different inflation requirements. Thus, the air valve cannot satisfy existing requirements, and an air valve of a tire bead seater is provided in the present disclosure.

SUMMARY

The objective of the present disclosure is to provide an air valve of a tire bead seater to solve the problems mentioned in the background, which has problems that the inner piston in the air valve is prone to be difficult in moving upwards or downwards due to a thermal expansion and contraction and the sealing performance is poor, and it is difficult to replace a barrel of the air valve with barrels in other different shapes to satisfy different inflation requirements when using the existing tire bead seater.

To fulfill the above objective, the present disclosure provides the following technical solution: an air valve of a tire bead seater including: an inflation cylinder, where a cylinder mouth is provided at a top end of the inflation cylinder, a removable flange is removably mounted at a top end of the cylinder mouth, an air delivery barrel is removably mounted at a top end of the removable flange, a fixed stand is removably mounted at a bottom end of the removable flange, a sealing piston is removably mounted at a top end of the fixed stand, four flange recesses are provided at a position of an outer surface of the air delivery barrel that is close to a bottom end of the air delivery barrel, four piston air holes are provided on an outer surface of the sealing piston, an upper sealing ring is mounted on a position of the outer surface of the sealing piston that is close to a top of the scaling piston, and a lower sealing ring is removably mounted at a position of the outer surface of the sealing piston that is close to a bottom of the sealing piston.

In an embodiment of the present disclosure, the bottom end of the removable flange is removably clamped into an inner of the top end of the cylinder mouth, five connection tubes are fixedly mounted at the top end of the fixed stand, six threaded connection port are provided at the bottom end of the removable flange, a threaded tube is fixedly mounted at a top end of the connection tube and each threaded tube is removably clamped into an inner of the threaded connection port, and the threaded tube is threaded connection with the threaded connection port.

In an embodiment of the present disclosure, a pneumatic sealing chamber is provided at the top end of the fixed stand, multiple air valve flow ports are provided at an outer surface of the pneumatic sealing chamber, a bottom end of the sealing piston is removably clamped into an inner of the pneumatic sealing chamber, a compression spring is removably mounted in an inner of the pneumatic sealing chamber, a piston bottom groove is provided at one surface of the bottom end of the sealing piston, and the compression spring is removably clamped into an inner of the piston bottom groove.

In an embodiment of the present disclosure, each one end of the piston air hole is located at a position of the air valve flow port, and the other end thereof is communicated and connected with an inner of the pneumatic sealing chamber, and the upper sealing ring and the lower sealing ring are made from PEEK material.

In an embodiment, a pressure relief hole is provided at a center position of a connection of the pneumatic sealing chamber and the fixed stand, an end of the pressure relief hole is communicated and connected with an inner of the threaded tube, a pressure relief tube is removably mounted on an outer surface of the removable flange, the pressure relief hole is communicated and connected with an inner of the pressure relief tube, and an inflation tube is removably mounted at one side of the top end of the removable flange, and the inflation tube is communicated and connected with an inner of the inflation cylinder.

In an embodiment of the present disclosure, four flange recesses are provided on an inner surface of the removable flange, a squeeze spring is removably mounted in an inner of the flange recess, an areshaped limit buckle is removably mounted in an inner of the flange recess, and an arc-shaped limit buckle is removably clamped into an inner of an arc-shaped barrel outer groove, and an arc-shaped groove is provided on one surface of a top end of the arc-shaped limit buckle.

In an embodiment of the present disclosure, one surface of a top end of the sealing piston is attached to one surface of the bottom end of the removable flange, and an outer diameter of the sealing piston is the same as an inner diameter of the pneumatic sealing chamber and the outer diameter of the sealing piston is greater than an inner diameter of the air delivery barrel.

In an embodiment of the present disclosure, one surface of the top end of the cylinder mouth and one surface of the moveable flange are provided with six flange connection holes, respectively, and the cylinder mouth is threaded connection with the removable flange through a bolt.

In an embodiment of the present disclosure, a handle is fixedly mounted on one side of the inflation cylinder, an air pump is provided in an inner of the handle, an exhaust tube is provided at a bottom end of the air pump, a suction tube is provided at a top end of the air pump, and the suction tube is communicated and connected with a bottom end of a pressure relief tube, and an air pump switch is removably mounted on an outer surface of the handle and the air pump switch is electrically connected to the air pump.

In an embodiment of the present disclosure, a pressure gauge is provided at a top end of the inflation tube, and an air outlet is provided at a top end of the air delivery barrel.

Compared with the prior art, the present disclosure has the following beneficial effects.

1. In the present disclosure, through a cooperation between the removable flange and the fixed stand, all parts of the air valve are assembled for use, then the air outlet is aligned to a position where inflate a tire, then the air pump is started by the air pump switch to draw air from the pressure relief tube through the suction tube, and then air is drawn from an inner of the pneumatic sealing chamber through a pressure relief hole; when an inner air pressure in the pneumatic sealing chamber decreases, the sealing piston is subjected to be pressed downwards and retreat to the inner of the pneumatic sealing chamber; thus, a bottom end of the air delivery barrel and the air valve flow port will be opened to allow air in the inflation cylinder to flow into the air delivery barrel through the air valve flow port, and finally, air will be discharged through the air outlet to inflate the tire; after the air pump is turn off, air will be delivered into the pneumatic sealing chamber through the piston air hole in the outer surface of the sealing piston to make the air pressure in the pneumatic sealing chamber return to normal, and then the sealing piston pops out and abuts against the bottom end of the moveable flange being subjected to an action of an elastic potential energy of the compression spring; thereby closing the bottom end of the air delivery barrel and the air valve flow port, and closing an air flow in the inflation cylinder.
2. Through a cooperation between the upper sealing ring and the lower sealing ring that are made from PEEK material, the air valve has a good temperature adaptability and a small deformation in a sealed state when the sealing piston moves upwards or downwards in the pneumatic sealing chamber, so as to prevent a poor sealing performance due to a temperature change generated by a lifting motion of an interior seal between the sealing piston and the pneumatic sealing chamber, and prevent a sliding movement of the sealing piston affected by an excessively tight connection between the upper sealing ring and the lower sealing ring with an inner wall of the pneumatic sealing chamber. Through a cooperation between the air delivery barrel and the arc-shaped limit buckle, when the device is in use and air delivery barrel needs to be replaced with an air delivery barrel with an air outlet in a different shape to inflate different tires, the air delivery barrel can be rotated by 45° to enable two side surfaces of the arc-shaped limit buckle to contact the surface of the arc-shaped barrel outer groove, such that the arc-shaped limit buckle retreats into an inner of the flange recess, and then, the air delivery barrel can be directly pulled out; then, an air delivery barrel in another shape is inserted into the removable flange, and then rotating the delivery barrel, so that the arc-shaped limit buckle pops out and clamps into an inner of the arc-shaped outer barrel groove under an action of an electric potential energy of the squeeze spring; thus, the air delivery barrel is fixed and prevented from falling off. In this way, the air delivery barrel can be changed and maintained conveniently.

BRIEF DESCRIPTION OF DRAWINGS

The technical solutions of the embodiments of the present disclosure will be clearly and completely described below in conjunction with the drawings of the embodiments. Obviously, the embodiments in the following description are merely illustrative, and are not all possible ones of the present disclosure.

Numeral reference: 1, inflation cylinder; 2, cylinder mouth; 3, removable flange; 4, flange connection hole; 5, pressure relief tube; 6, inflation tube; 7, pressure gauge; 8, air delivery barrel; 9, air outlet; 10, handle; 11, air pump switch; 12, fixed stand; 13, air pump; 14, exhaust tube; 15, suction tube; 16, pressure relief hole; 17, pneumatic sealing chamber; 18, compression spring; 19, sealing piston; 20, threaded tube; 21, threaded connection port; 22, piston bottom groove; 23, piston air hole; 24, upper sealing ring; 25, lower sealing ring; 26, air valve flow port; 27, connection tube; 28, arc-shaped barrel outer groove: 29, flange recess; 30, squeeze spring; 31, arc-shaped limit buckle.

DETAILED DESCRIPTION

The technical solutions of the embodiments of the present disclosure will be clearly and completely described below in conjunction with the drawings of the embodiments. Obviously, the described embodiments are part of the embodiments of the present disclosure not all of them.

Figure 1:
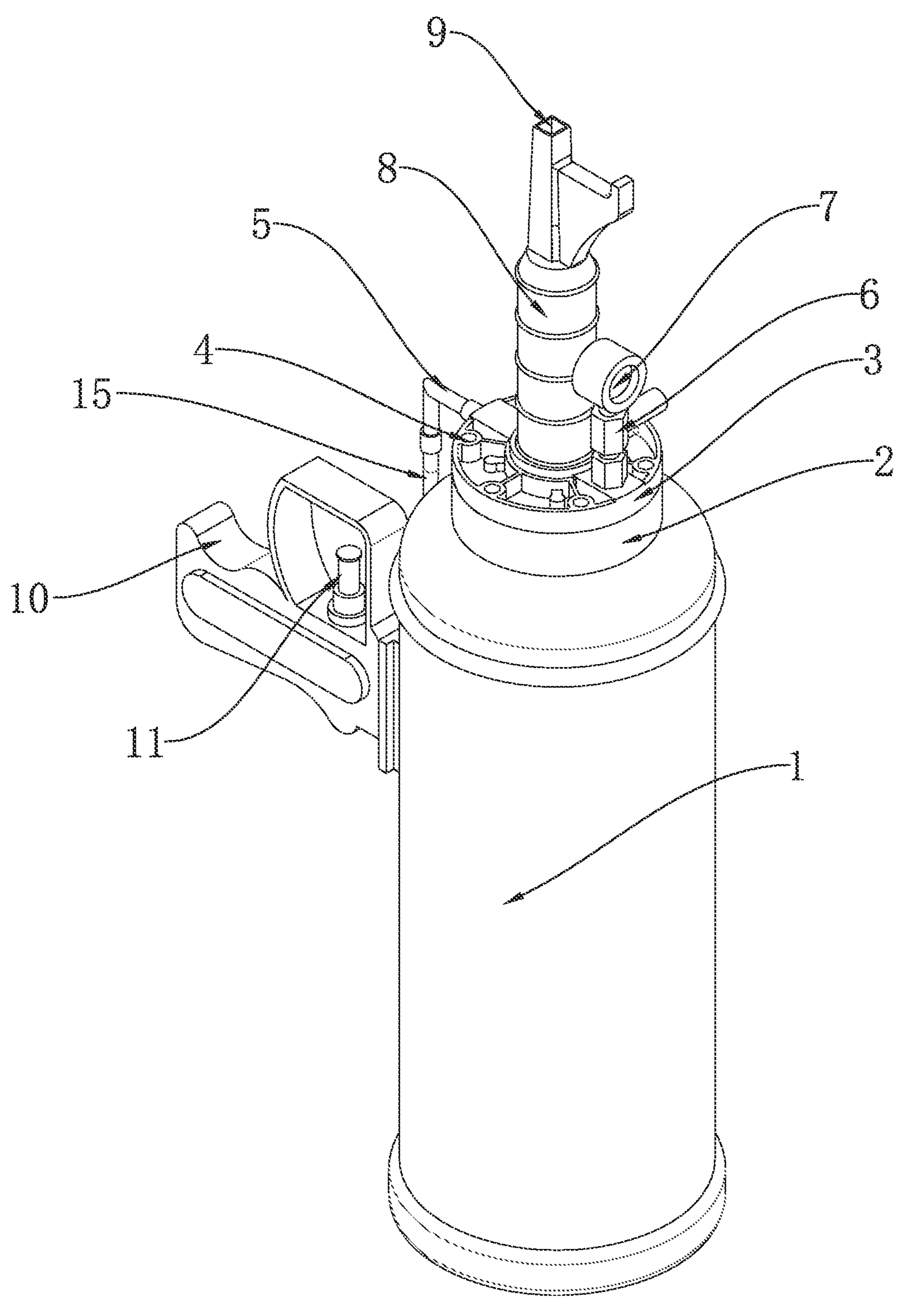
FIG. 1 is an overall structural view of the present disclosure.
Figure 2:
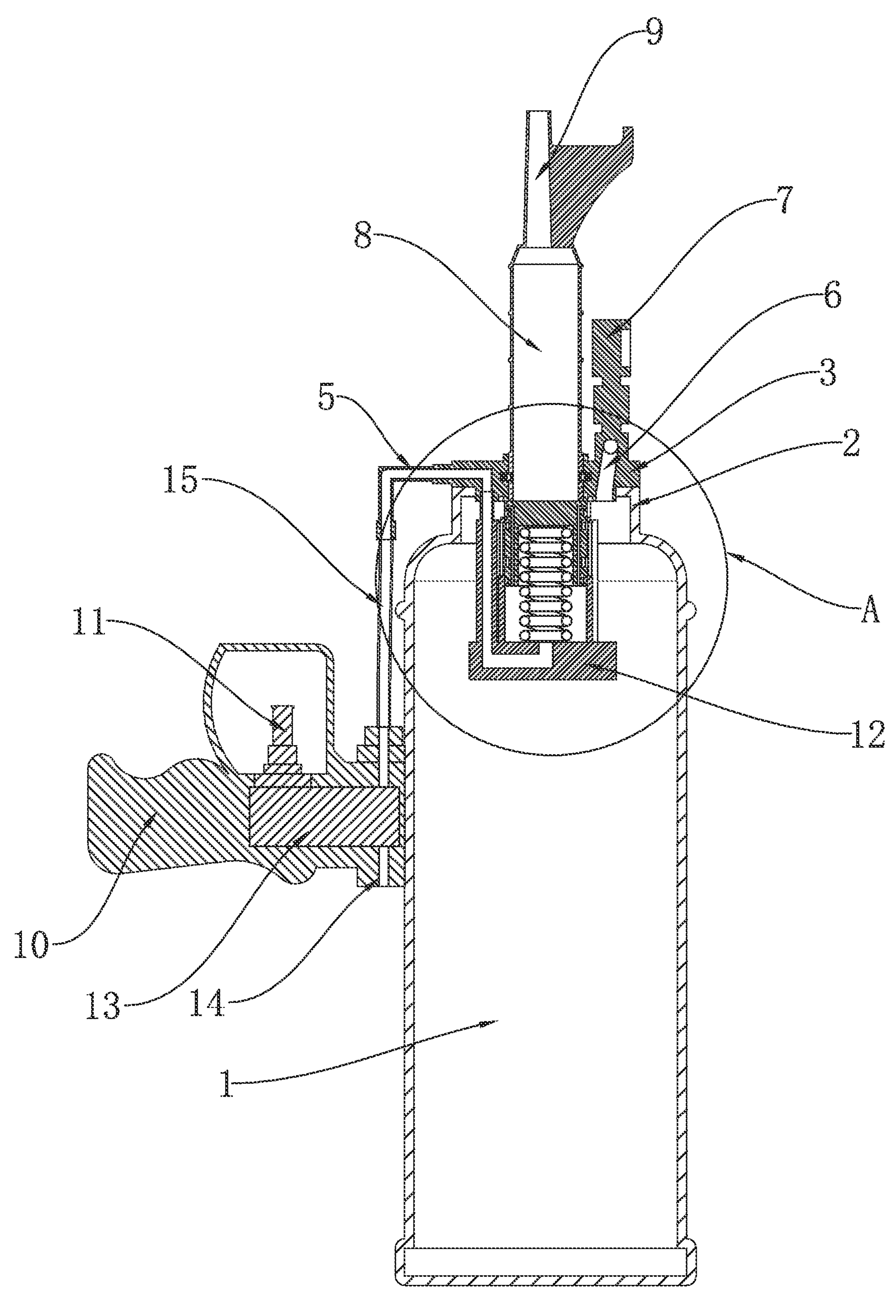
FIG. 2 is an overall sectional front view of the present disclosure.
Figure 3:
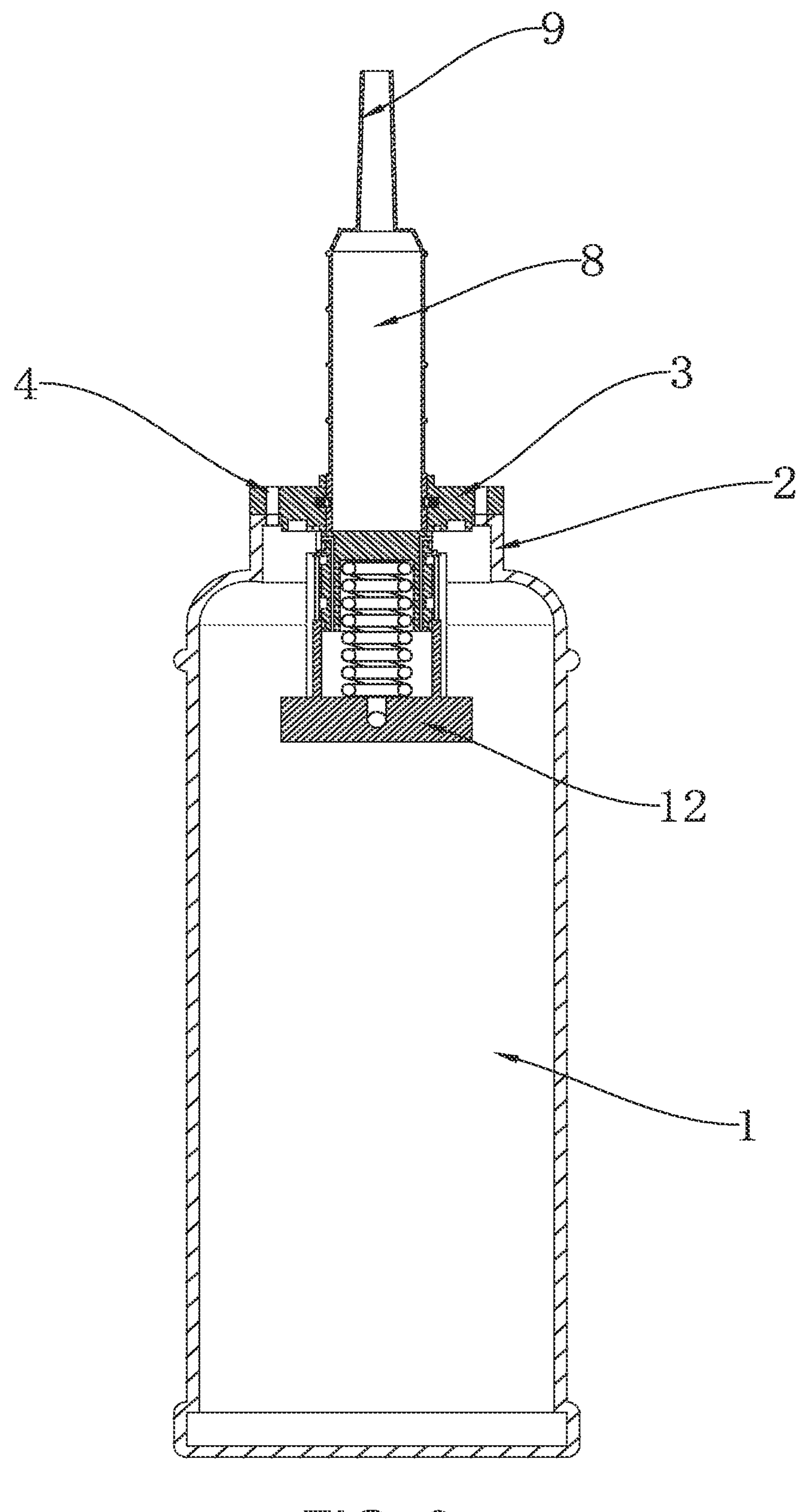
FIG. 3 is an overall sectional side view of the present disclosure.
Figure 4:
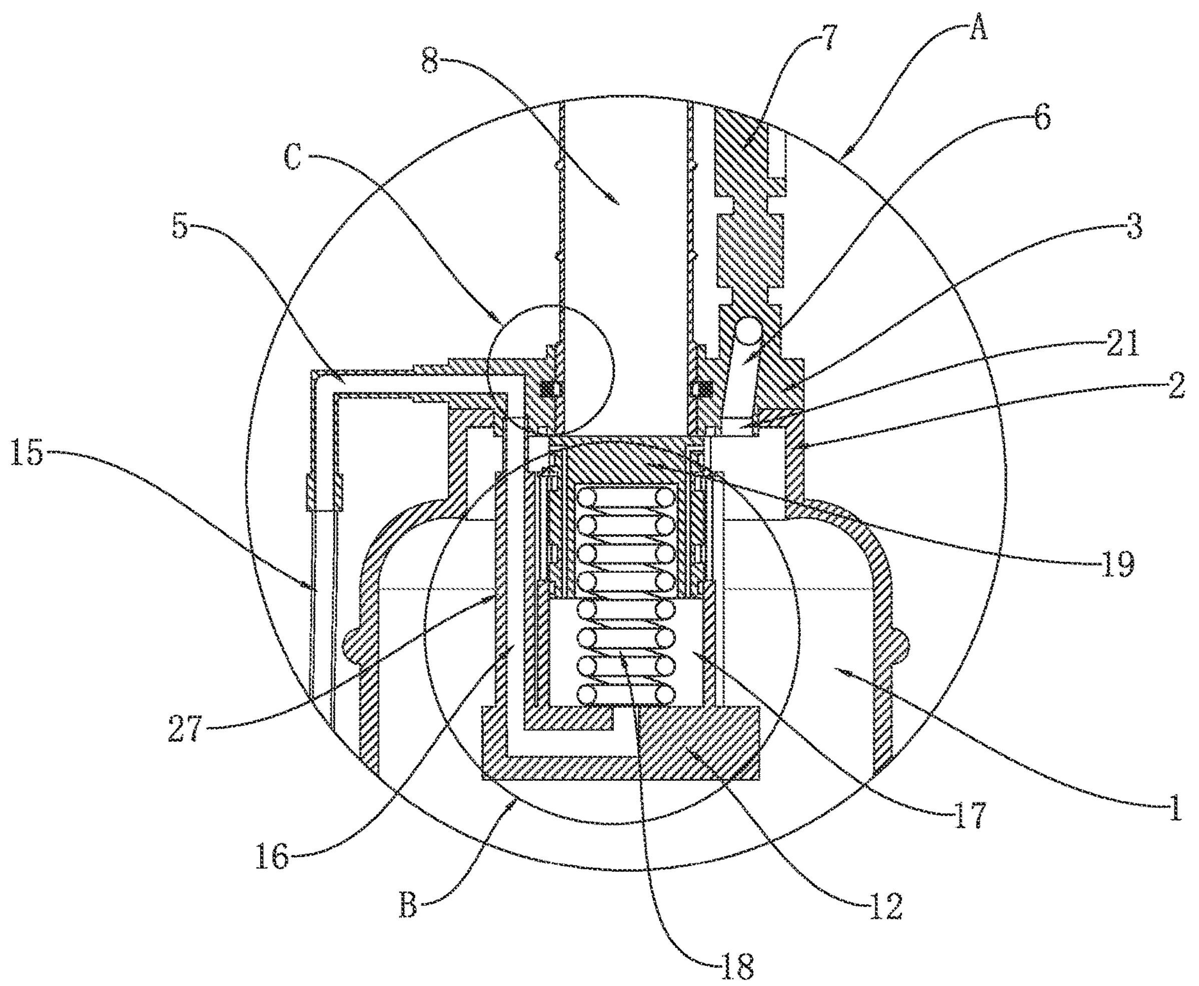
FIG. 4 is a structural view of part A of the present disclosure.
Figure 5:
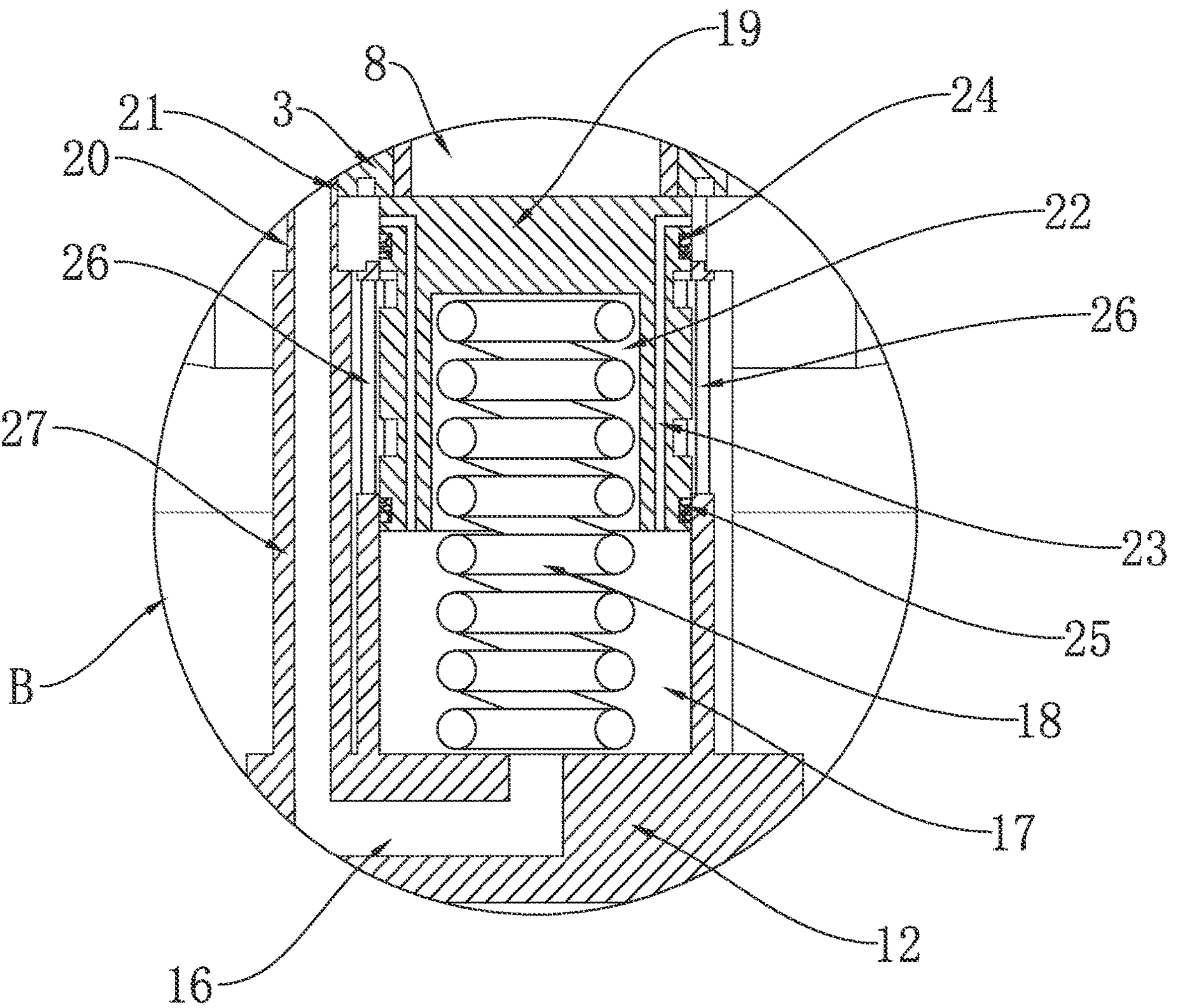
FIG. 5 is a structural view of part B of the present disclosure.
Figure 6:
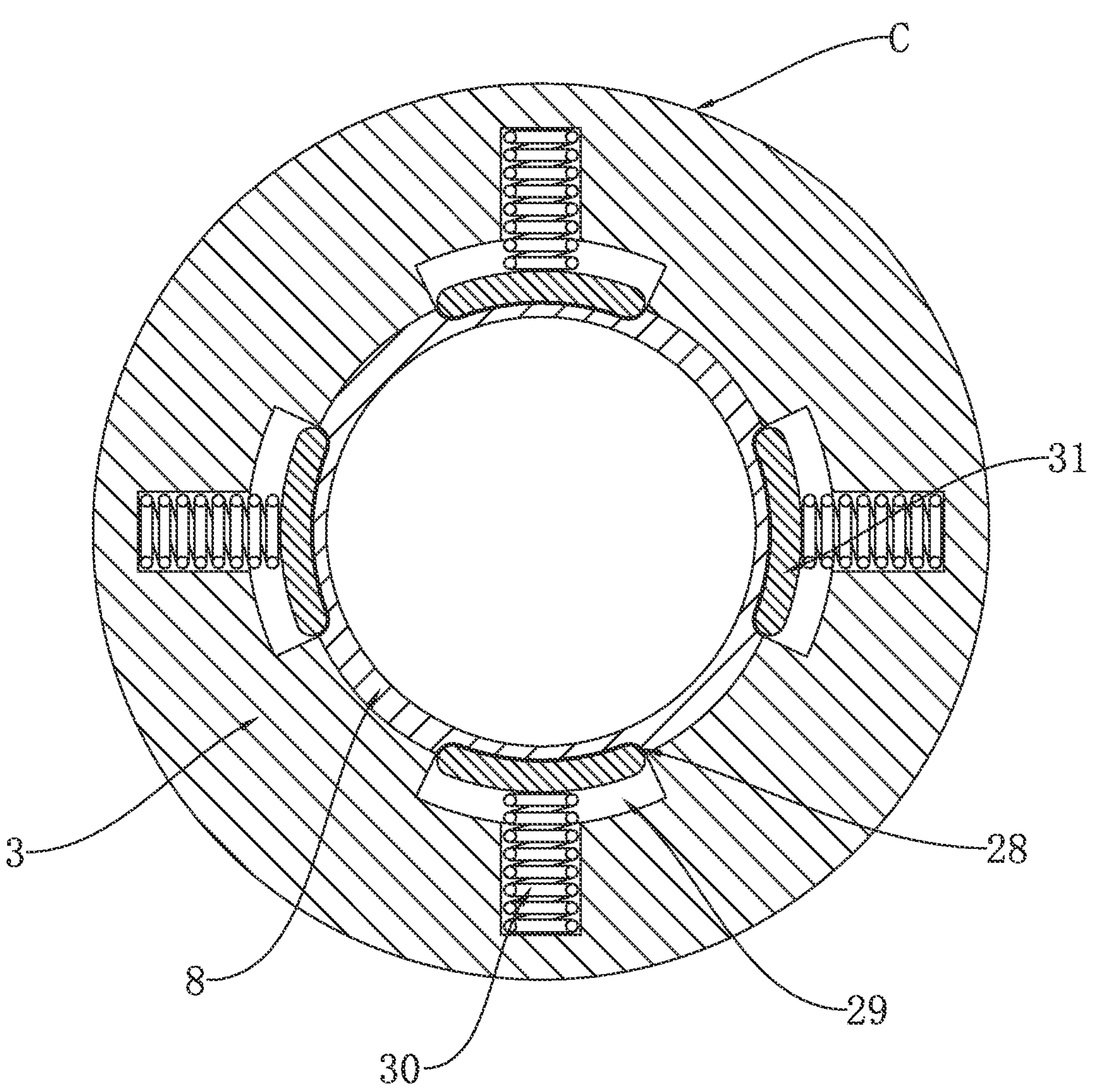
FIG. 6 is a sectional top view of part C of the present disclosure.

Referring to FIG. 1-FIG. 6, the present disclosure provides an embodiment: an air valve for a tire bead seater, which includes an inflation cylinder 1; a cylinder mouth 2 is provided at a top end of the inflation cylinder 1, a removable flange 3 is removably mounted at a top end of the cylinder mouth 2, an air delivery barrel 8 is removably mounted at a top end of the removable flange 3, a fixed stand 12 is removably mounted at a bottom end of the removable flange 3, a sealing piston 19 is removably mounted at a top end of the fixed stand 12, four flange recesses 29 are provided at a position of an outer surface of the air delivery barrel 8 that is close to a bottom end of the air delivery barrel 8, four piston air holes 23 are provided on an outer surface of the sealing piston 19, an upper sealing ring 24 is mounted on a position of the outer surface of the sealing piston 10 that is close to a top of the sealing piston 19, and a lower sealing ring 25 is removably mounted at a position of the outer surface of the sealing piston 19 and is close to a bottom of the sealing piston 19.

By adopting the above technical solution, through a cooperation between the removable flange 3 and the fixed stand 12, all parts of the air valve are assembled for use, then an air outlet 9 is aligned to a position where inflate a tire, then the air pump 13 is started by the air pump switch 11 to draw air from a pressure relief tube 5 through a suction tube 15, and then air is drawn from an inner of the pneumatic sealing chamber 17 through a pressure relief hole 16; when an inner air pressure in the pneumatic sealing chamber 17 decreases, the sealing piston 19 is subjected to be pressed downwards and retreat to the inner of the pneumatic sealing chamber 17; thus, a bottom end of the air delivery barrel 8 and the air valve flow port 26 will be opened to allow air in the inflation cylinder 1 to flow into the air delivery barrel 8 through the air valve flow port 26, and finally, air will be discharged through the air outlet 9 to inflate the tire.

Further, the bottom end of the removable flange 3 is removably clamped into an inner of the top end of the cylinder mouth 2, five connection tubes 27 are fixedly mounted at the top end of the fixed stand 12, six threaded connection ports 21 are provided at the bottom end of the removable flange 3, a threaded tube 20 is fixedly mounted at a top end of the connection tube 27 and each threaded tube 20 is removably clamped into an inner of the threaded connection port 21, and the threaded tube 20 is threaded connection with the threaded connection port 21.

Further, a pneumatic sealing chamber 17 is provided at the top end of the fixed stand 12, multiple air valve flow ports 26 are provided at an outer surface of the pneumatic sealing chamber 17, a bottom end of the sealing piston 19 is removably clamped into an inner of the pneumatic sealing chamber 17, a compression spring 18 is removably mounted in an inner of the pneumatic sealing chamber 17, a piston bottom groove 22 is provide at one surface of the bottom end of the sealing piston 19, and the compression spring 18 is removably clamped into an inner of the piston bottom groove 22.

Further, each one end of the piston air hole 23 is located at a position of the air valve flow port 26, and each other end of the air hole 23 is communicated and connected with an inner of the pneumatic sealing chamber 17, and the upper sealing ring 24 and the lower sealing ring 25 are made from PEEK material.

By adopting the above technical solution, through a cooperation between the upper sealing ring 24 and the lower sealing ring 25 that are made from PEEK material, the air valve has a good temperature adaptability and a small deformation in a sealed state, so as to prevent a poor sealing performance due to a temperature change generated by a lifting motion of an interior seal between the sealing piston 19 and the pneumatic sealing chamber 17, and prevent a sliding movement of the sealing piston 19 affected by an excessively tight connection between the upper sealing ring 24 and the lower sealing ring with an inner wall of the pneumatic sealing chamber 17.

Further, a pressure relief hole 16 is provided at a center position of a connection of the pneumatic sealing chamber 17 and the fixed stand 12, one end of the pressure relief hole 16 is communicated and connected with an inner of the pneumatic sealing chamber 17, a pressure relief tube 5 is removably mounted on an outer surface of the removable flange 3, the pressure relief hole 16 is communicated and connected with an inner of the pressure relief tube 5, and an inflation tube 6 is removably mounted at one side of the top end of the removable flange 3, and the inflation tube 6 is communicated and connected with an inner of the inflation cylinder 1.

By adopting the above technical solution, after the air pump 13 is turn off, air will be delivered into the pneumatic sealing chamber 17 through the piston air holes 23 in the outer surface of the sealing piston 19 to make the air pressure in the pneumatic sealing chamber 17 return to normal, and then the sealing piston 19 pops out and abuts against the bottom end of the removable flange 3 being subjected to an action of an elastic potential energy of the compression spring 18; thereby closing the bottom end of the air delivery barrel 8 and the air valve flow ports 26, and closing an air flow in the inflation cylinder 1.

Further, four flange recesses 29 are provided on an inner surface of the removable flange 3, a squeeze spring 30 is removably mounted in an inner of the flange recess 29, an arc-shaped limit buckle 31 is removably mounted in the flange recess 29 and the arc-shaped limit buckle 31 is removably clamped into an inner of an arc-shaped barrel outer groove 28, and an arc-shaped groove is provided on one surface of a top end of the arc-shaped limit buckle 31.

By adopting the above technical solution, through a cooperation between the air delivery barrel 8 and the arc-shaped limit buckle 31, when the device is in use and air delivery barrel 8 needs to be replaced with an air delivery barrel 8 with an air outlet in a different shape to inflate different tires, the air delivery barrel 8 can be rotated by 45° to enable two side surfaces of the arc-shaped limit buckle 31 to contact the surface of the arc-shaped barrel outer groove 28, such that the arc-shaped limit buckle 31 retreat into an inner of the flange recess 29, and then, the air delivery barrel 8 can be directly pulled out; then, an air delivery barrel 8 in another shape is inserted into the removable flange 3, and then rotating the air delivery barrel 8, so that the arc-shaped limit buckle 31 pops out and clamps into an inner of the arc-shaped outer barrel groove 28 under an action of an electric potential energy of the squeeze spring 30; thus, the air delivery barrel 8 is fixed and prevented from falling off. In this way, the air delivery barrel 8 can be changed and maintained conveniently.

Further, one surface of the top end of the sealing piston 19 is attached to one surface of the bottom end of the removable flange 3, and an outer diameter of the sealing piston 19 is the same as the inner diameter of the pneumatic sealing chamber 17 and the outer diameter of the sealing piston 19 is greater than an inner diameter of the air delivery barrel 8.

Further, one surface of the top end of the cylinder mouth 2 and one surface of the removable flange 3 are provided with six flange connection holes 4, respectively, and the cylinder mouth 2 is threaded connection with the removable flange 3 through a bolt.

Further, a handle 10 is fixedly mounted on one side of the inflation cylinder 1, an air pump 13 is provide in an inner of the handle 10, an exhaust tube 14 is provided at a bottom end of the air pump 13, a suction tube 15 is provided at a top end of the air pump 13 and the suction tube 15 is communicated and connected with a bottom end of a pressure relief tube 5, and an air pump switch 11 is removably mounted on an outer surface of the handle 10 and the air pump switch 11 is electrically connected to the air pump 13.

Further, a pressure gauge 7 is provide at a top end of the inflation tube 6, and an air outlet 9 is provided at a top end of the air delivery barrel 8.

Operating principle: during use, through the cooperation between the removable flange 3 and the fixed stand 12, all parts of the air valve are assembled for use, then the air outlet 9 is aligned to a position where inflate a tire, then the air pump 13 is started by the air pump switch 11 to draw air from the pressure relief tube 5 through the suction tube 15, and then air is drawn from an inner of the pneumatic sealing chamber 17 through the pressure relief hole 16; when the inner air pressure in the pneumatic sealing chamber 17 decreases, the sealing piston 19 is subjected to be pressed downwards and retreat to the inner of the pneumatic sealing chamber 17; then, the bottom end of the air delivery barrel 8 and the air valve flow ports 26 will be opened to allow air in the inflation cylinder 1 to flow into the air delivery barrel

8 through the air valve flow port 26, and finally, air will be discharged through the air outlet 9 to inflate the tire. After the air pump 13 is turn off, air will be delivered into the pneumatic sealing chamber 17 through the piston air hole 23 in the outer surface of the sealing piston 19 to make the air pressure in the pneumatic sealing chamber 17 return to normal, and then the sealing piston 19 pops out and abuts against the bottom end of the removable flange 3 being subjected to an action of an elastic potential energy of the compression spring 18; thereby closing the bottom end of the air delivery barrel 9 and the air valve flow ports 26, and closing the air flow in the inflation cylinder 1.

Through a cooperation between the upper sealing ring 24 and the lower sealing ring 25 that are made from PEEK material, the air valve can have a good temperature adaptability and a small deformation in a sealed state when the sealing piston 19 moves upwards or downwards in the pneumatic sealing chamber 17, so as to prevent a poor sealing performance due to a temperature change generated by a lifting motion of an interior seal between the sealing piston and a pneumatic sealing chamber, and prevent a sliding movement of the sealing piston affected by an excessively tight connection between the upper sealing ring and the lower sealing ring with an inner wall of the pneumatic sealing chamber. Through a cooperation between the air delivery barrel 8 and the arc-shaped limit buckle 31, when the device is in use and air delivery barrel 8 needs to be replaced with an air delivery barrel 8 with an air outlet in a different shape to inflate different tires, the air delivery barrel 8 can be rotated by 45° to enable two side surfaces of the arc-shaped limit buckle 31 to contact the surface of the arc-shaped barrel outer groove 28, such that the arc-shaped limit buckle 31 retreats into an inner of the flange recess 29, and then the air delivery barrel 8 can be directly pulled out; then, an air delivery barrel 8 in another shape is inserted into the removable flange 3, and then rotating the air delivery barrel 8, so that the arc-shaped limit buckle 31 pops out and clamps into an inner of the arc-shaped outer barrel groove 28 under an action of an electric potential energy of the squeeze spring 30; thus, the air delivery barrel 8 is fixed and prevented from falling off. In this way, the air delivery barrel 8 can be changed and maintained conveniently.

For those skilled in the art, it is obvious that that the present disclosure is not limited to the details of the above illustrative embodiments and can be implemented in other specific forms without deviating from the spirit or basic features of the prevent disclosure. Therefore, from any point of view, these embodiments should be construed as illustrative rather than restrictive, the scope of the present disclosure should be defined by the claims rather than the above description; thus, the scope of the present disclosure aims to include all modifications made within the meanings and scopes of equivalents element of the claims. The reference number in the claims should not be construed as limitations of the claims.

What is claimed is:

1. An air valve of a tire bead seater, comprising an inflation cylinder, wherein a cylinder mouth is provided at a top end of the inflation cylinder, a removable flange removably mounted at a top end of the cylinder mouth, an air delivery barrel is removably mounted at a top end of the removable flange, a fixed stand is removably mounted at a bottom end of the movable removable flange, a sealing piston is movably-removably mounted at a top end of the fixed stand, four flange recesses are provided at a position of an outer surface of the air delivery barrel that is close to a bottom end of the air delivery barrel, four piston air holes are provided on an outer surface of the sealing piston, an upper sealing ring is mounted on a position of the outer surface of the sealing piston that is close to a top of the sealing piston, and a lower sealing ring is removably mounted at a position of the outer surface of the scaling piston that is close to a bottom of the sealing piston.

2. The air valve of a tire bead seater according to claim 1, wherein the bottom end of the removable flange is removably clamped into an inner of the top end of the cylinder mouth, five connection tubes are fixedly mounted at the top end of the fixed stand, six threaded connection ports are provided at the bottom end of the removable flange, a threaded tube is fixedly mounted at a top end of the connection tube and each threaded tube is removably clamped into an inner of the threaded connection port, and the threaded tube is threaded connection with the threaded connection port.

3. The air valve of a tire bead seater according to claim 1, wherein a pneumatic sealing chamber is provided at the top end of the fixed stand, multiple air valve flow ports are provided at an outer surface of the pneumatic sealing chamber, a bottom end of the sealing piston is removably clamped into an inner of the pneumatic sealing chamber, a compression spring is removably mounted in an inner of the pneumatic sealing chamber, a piston bottom groove is provided at one surface of the bottom end of the sealing piston, and the compression spring is removably clamped into an inner of the piston bottom groove.

4. The air valve of a tire bead seater according to claim 3, wherein each one end of the piston air hole is located at a position of the air valve flow port, and the other end thereof is communicated and connected with an inner of the pneumatic sealing chamber, and the upper sealing ring and the lower sealing ring are made from PEEK material.

5. The air valve of a tire bead seater according to claim 3, wherein a pressure relief hole is provided at a center position of a connection of the pneumatic sealing chamber and the fixed stand, one end of the pressure relief hole is communicated and connected with an inner of one threaded tube, a pressure relief tube is removably mounted on an outer surface of the removable flange, the pressure relief hole is communicated and connected with an inner of the pressure relief tube, and an inflation tube is removably mounted at one side of the top end of the removable flange, and the inflation tube is communicated and connected with an inner of the inflation cylinder.

6. The air valve of a tire bead seater according to claim 5, wherein a pressure gauge is provided at a top end of the inflation tube, and an air outlet is provided at a top end of the air delivery barrel.

7. The air valve of a tire bead seater according to claim 1, wherein said four flange recesses are provided on an inner surface of the removable flange, a squeeze spring is removably mounted in an inner of the flange recess, an arc-shaped limit buckle is removably mounted in an inner of the flange recess and the arc-shaped limit buckle is removably clamped into an inner of an arc-shaped barrel outer groove, and an arc-shaped groove is provided on one surface of a top end of the arc-shaped limit buckle.

8. The air valve of a tire bead seater according to claim 1, wherein one surface of a top end of the sealing piston is attached to one surface of the bottom end of the removable flange, and an outer diameter of the sealing piston is the same as an inner diameter of the pneumatic sealing chamber and the outer diameter of the sealing piston is greater than an inner diameter of the air delivery barrel.

9. The air valve of a tire bead seater according to claim 1, wherein one surface of the top end of the cylinder mouth and one surface of the removable flange are provided with six flange connection holes, respectively, and the cylinder mouth is threaded connection with the removable flange through a bolt.

10. The air valve of a tire bead seater according to claim 1, wherein a handle is fixedly mounted on one side of the inflation cylinder, an air pump is provided in an inner of the handle, an exhaust tube is provided at a bottom end of the air pump, a suction tube is provided at a top end of the air pump, and the suction tube is communicated and connected with a bottom end of a pressure relief tube, and an air pump switch is removably mounted on an outer surface of the handle and the air pump switch is electrically connected to the air pump.

* * * * *